(12) United States Patent
Fujimaki et al.

(10) Patent No.: US 6,870,806 B2
(45) Date of Patent: Mar. 22, 2005

(54) MAGNETIC HEAD PROVIDED WITH MOMENT-REDUCING CONTACT FOR DATA STORAGE MEDIUM

(75) Inventors: Tohru Fujimaki, Kawasaki (JP);
Tsuyoshi Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 165 days.

(21) Appl. No.: 10/282,491

(22) Filed: Oct. 29, 2002

(65) Prior Publication Data

US 2003/0142593 A1 Jul. 31, 2003

(30) Foreign Application Priority Data

Jan. 25, 2002 (JP) ........................................ 2002-016668

(51) Int. Cl.[7] .............................................. G11B 11/10
(52) U.S. Cl. .................................. 369/300; 369/13.17
(58) Field of Search ............................ 369/300, 13.17, 369/112.24; 360/235.4, 236.7

(56) References Cited

U.S. PATENT DOCUMENTS

| | | | | | |
|---|---|---|---|---|---|
| 4,594,702 | A | * | 6/1986 | Livingston | .................. 359/823 |
| 4,636,894 | A | * | 1/1987 | Mo | .......................... 360/236.3 |
| 4,639,803 | A | * | 1/1987 | Takeda et al. | ........... 360/235.3 |
| 4,814,920 | A | * | 3/1989 | Yamano et al. | .............. 360/122 |
| 4,863,809 | A | * | 9/1989 | Brar et al. | ................... 428/623 |
| 4,998,174 | A | * | 3/1991 | Wada et al. | .............. 360/234.3 |
| 5,124,961 | A | * | 6/1992 | Yamaguchi et al. | ......... 369/300 |
| 6,434,088 | B1 | * | 8/2002 | Ishizaki et al. | ........... 369/13.33 |
| 6,563,785 | B2 | * | 5/2003 | Schaenzer et al. | ........... 369/300 |
| 6,577,575 | B2 | * | 6/2003 | Novotny et al. | ............... 369/71 |
| 6,628,604 | B2 | * | 9/2003 | Van Kesteren et al. | ...... 369/300 |
| 2001/0024422 | A1 | * | 9/2001 | Kasono et al. | .............. 369/300 |
| 2002/0172144 | A1 | * | 11/2002 | Uno et al. | .................... 369/300 |

FOREIGN PATENT DOCUMENTS

| | | | | |
|---|---|---|---|---|
| JP | 04339376 A | * | 11/1992 | ........... G11B/21/21 |
| JP | 11-250402 | | 9/1999 | |

* cited by examiner

*Primary Examiner*—Brian E. Miller
(74) *Attorney, Agent, or Firm*—Greer, Burns & Crain, Ltd.

(57) ABSTRACT

A magnetic head is provided with a substrate and a magnetic field generating coil formed on the substrate. The substrate has a principal surface facing a storage disk and divided into an inner area and an outer area surrounding the inner region. The magnetic head also includes a dielectric layer enclosing the coil and facing the storage disk. The dielectric layer is formed in the inner area of the principal surface of the substrate but not in the outer area. As tilting, the storage disk comes into contact with the dielectric layer, thereby being prevented from bumping into the outer area of the principal surface of the substrate.

12 Claims, 6 Drawing Sheets

MAGNETIC HEAD PROVIDED WITH MOMENT-REDUCING CONTACT FOR DATA STORAGE MEDIUM

BACKGROUND OF THE INVENTION

1. Field of the Invention

The present invention relates to a magnetic head used in a data writing/reading apparatus for writing data to or reading from a recording medium such as a magnetic disk or a magneto-optical disk. In this specification, a "magnetic head" is defined as any type of writing/reading head provided with a magnetic field generating coil. By this definition, a magneto-optical head may simply be referred to as "magnetic head." The present invention also relates to a data writing/reading apparatus incorporating such a magnetic head.

2. Description of the Related Art

Figure 7:
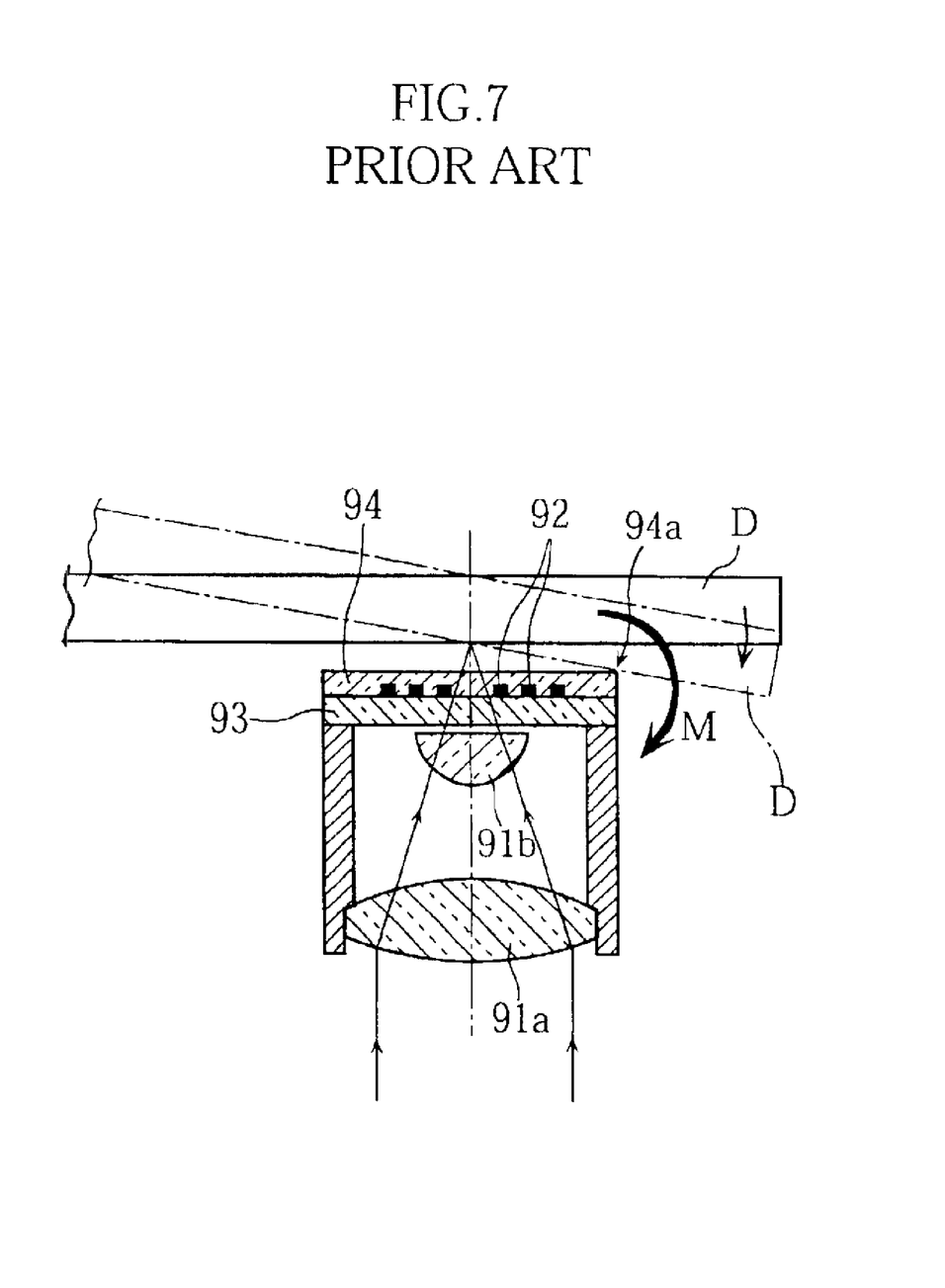
FIG. 7 shows a conventional magnetic head and a magneto-optical disk tilting above the magnetic head.

FIG. 7 shows a conventional magnetic head including a substrate 93 and a coil 92 formed on the substrate 93. The coil 92 is entirely enclosed by a transparent dielectric layer 94 that has a uniform thickness and covers entirely the upper surface of the substrate 93. Below the substrate 93 are provided a diametrically larger objective lens 91a and a diametrically smaller objective lens 91b. After being emitted from an unillustrated light source, laser beams are converged by the two objective lenses 91a, 91b and pass through the substrate 93 and the dielectric layer 94, to form a beam spot on the recording layer of the disk D. For performing data recording by magnetic field modulation, the magnetic field generated by the coil 92 is applied to the recording layer at the point where the beam spot is produced. For focus control, the magnetic head is supported by an actuator (not shown) so that it can be moved closer to or away from the disk D.

While the conventional magnetic head is advantageous in that the dielectric layer 94 of the uniform thickness protects the coil 92 from external mechanical damage, it has the following drawback.

Typically the magneto-optical disk D includes a thin substrate upon which a recording layer is formed. Due to this rather weak supporting structure, the disk D is liable to warp, thereby coming into contact with the edge 94a of the dielectric layer 94. Even if the disk D itself is not warped, it may tilt, as shown by the single-dot chain lines in FIG. 7, due to unsteady rotation of a spindle supporting the disk D. In this instance again, the disk D may come into contact with the edge 94a of the dielectric layer 94.

Unfavorably, the disk D may be damaged by the contact with the dielectric layer 94. Further, the actuator, which is coupled to the magnetic head, may also be damaged since a rather strong moment M can be exerted on the magnetic head when the disk D bumps into the dielectric layer 94.

SUMMARY OF THE INVENTION

The present invention has been proposed under the circumstances described above. It is, therefore, an object of the present invention to provide a magnetic head arranged to reduce a moment produced by the contact between the recording medium and the magnetic head. Another object of the present invention is to provide a data writing/reading apparatus incorporating such a magnetic head.

According to a first aspect of the present invention, there is provided a magnetic head that is provided with: a coil for generating a magnetic field applied to a recording medium; a substrate having a principal surface facing the recording medium, the principal surface including an inner region and an outer region surrounding the inner region; and a contact member facing the recording medium, the contact member coming into contact with the recording medium when the recording medium tilts. The contact member is disposed only within the inner region of the principal surface so as to prevent the tilting recording medium from coming into contact with the outer region of the principal surface.

Preferably, the contact member may be a dielectric layer formed on the substrate to enclose the coil.

Preferably, the dielectric layer may include a marginal portion spaced from the outer edge of the substrate toward the center of the substrate. This marginal portion comes into contact with the tilting recording medium.

Preferably, the dielectric layer may consist of a lower sub-layer and an upper sub-layer formed on an inner region of the lower sub-layer. In this instance, the upper sub-layer may include a marginal portion that comes into contact with the tilting recording medium.

Preferably, the coil may include a first conductive spiral and a second conductive spiral, wherein the first conductive spiral is arranged within the upper sub-layer, while the second conductive spiral is arranged within the lower sub-layer.

Preferably, the marginal portion of the dielectric layer may be rounded or chamfered so that the recording medium is not damage by the contact with the dielectric layer.

Preferably, the contact member may be coated with a lubricant for preventing the recording medium from being damaged by the contact member.

According to a second aspect of the present invention, there is provided a magnetic head that is provided with: a substrate including a principal surface facing a recording medium; a magnetic field generating coil formed on the principal surface of the substrate and comprising a first conductor and a second conductor that is located closer to the recording medium than the first conductor is; and a dielectric layer formed on the principal surface of the substrate and enclosing the coil. The second conductor is smaller in outer diameter than the first conductor. The dielectric layer has a stepped configuration. Specifically, the dielectric layer includes a first portion enclosing the first conductor of the coil and a second portion enclosing the second conductor of the coil. The second portion of the dielectric layer is smaller in size than the first portion thereof.

Preferably, the magnetic head may further include a first cooling metal ring that surrounds the first conductor of the coil and a second cooling metal ring that surrounds the second conductor of the coil. The second cooling metal ring is smaller in diameter than the first cooling metal ring.

Preferably, the magnetic head may further include an objective lens arranged on the opposite side to the principal surface of the substrate for convergence of light beams emitted from a light source. The converged light beams pass through the substrate and the dielectric layer to travel toward the recording medium.

Preferably, the magnetic head may further include an antireflection layer facing the recording medium, wherein the antireflection layer is arranged within a recess formed in the dielectric layer. The light beams converged by the objective lens pass through the antireflection layer and travel toward the recording medium.

Preferably, the substrate is supported by an actuator so as to be moved closer to and away from the recording medium by the actuator.

Other features and advantages of the present invention will become apparent from the detailed description given below with reference to the accompanying drawings.

DETAILED DESCRIPTION OF THE PREFERRED EMBODIMENT

A preferred embodiment of the present invention will be described below with reference to the accompanying drawings.

Figure 1:
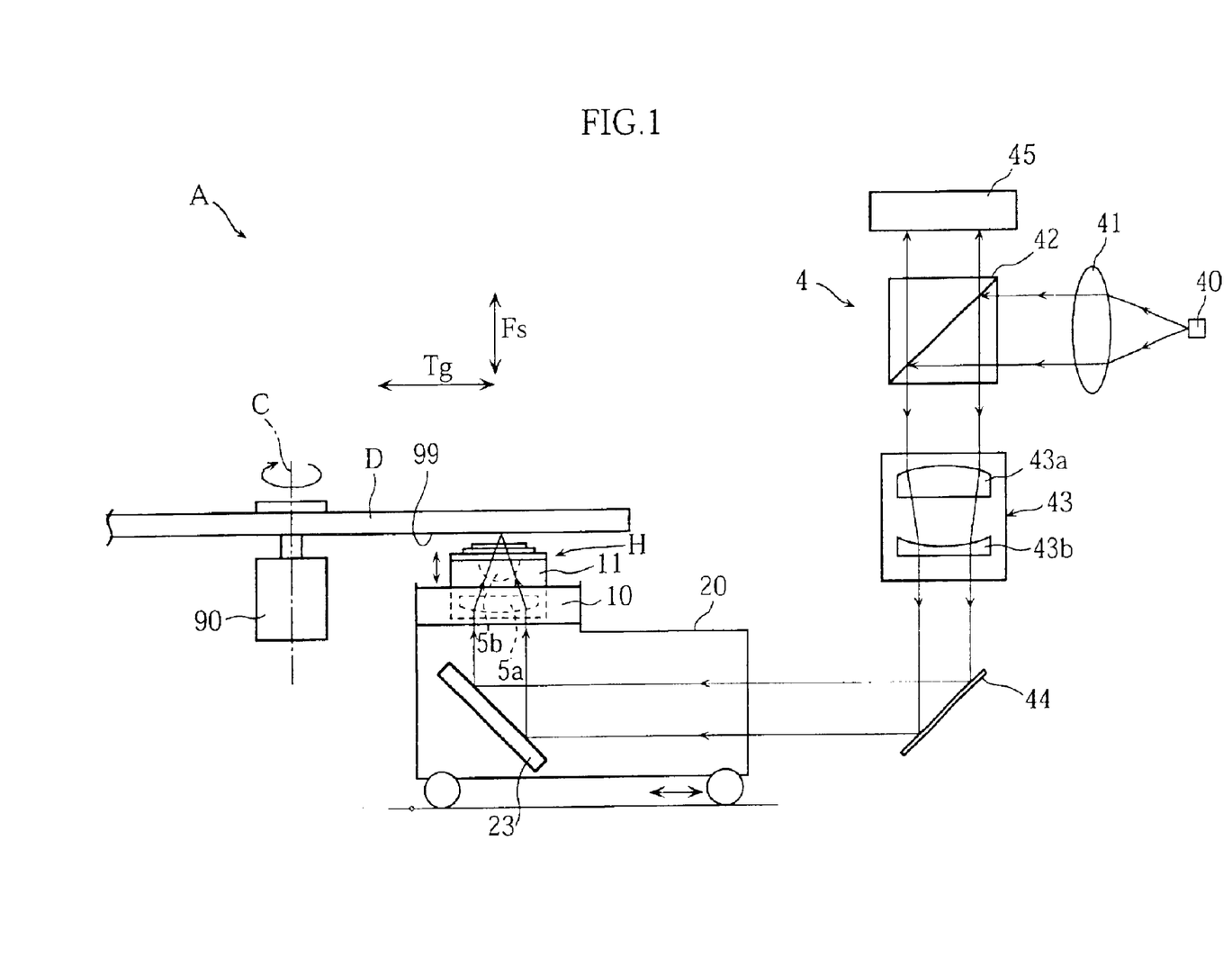
FIG. 1 shows the principal components of a data writing/reading apparatus incorporating a magnetic head according to the present invention.

FIG. 1 shows the principal components of a data writing/reading apparatus A incorporating a magnetic head according to the present invention. Precisely, the magnetic head H of the illustrated embodiment is a magneto-optical head, so that the apparatus A can write data to a magneto-optical disk D and read it from the disk.

The magnetic head H, supported by a carriage 20 via an actuator 10, includes a lens holder 11 to which two objective lenses 5a, 5b are fixed. The lens holder 11 is moved by the actuator 10 in the focus direction Fs and the tracking direction Tg (the radial direction of the disk D).

Figure 2:
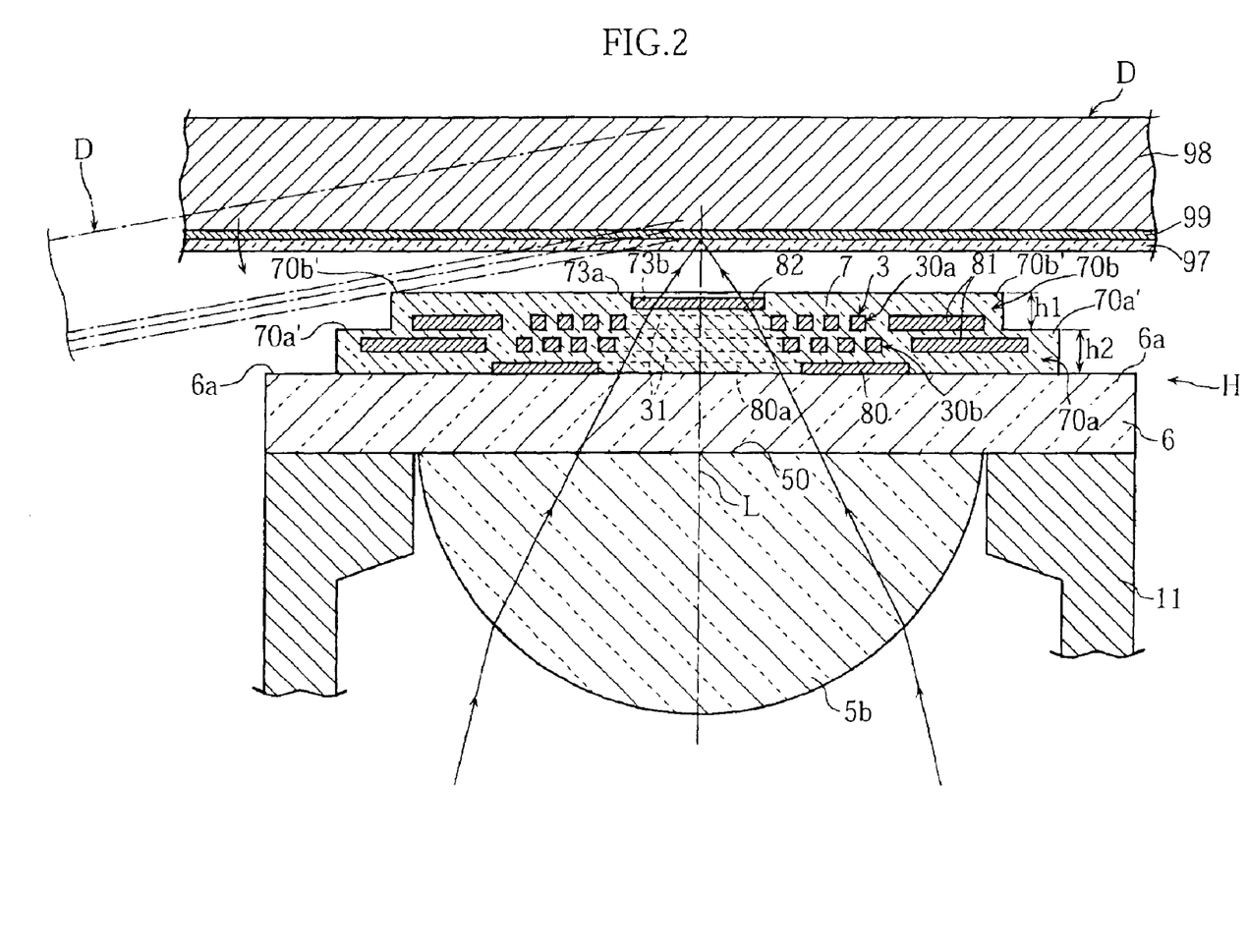
FIG. 2 is a sectional view showing the details of the magnetic head of the present invention.

The magneto-optical disk D can be rotated at high speed about the axis C by a spindle motor 90. As shown in FIG. 2, the disk D includes a base plate 98 upon which a recording layer 99 and a transparent coating layer 97 for protection of the recording layer 99 are formed. The two layers 99, 97 are provided on the lower side of the base plate 98. Correspondingly, the magnetic head H is disposed under the disk D and held in direct facing relation to the recording layer 99. With this arrangement, it is possible to reduce aberration observed in forming a beam spot on the recording layer 99 due to the thickness variation of the transparent coating layer 97.

As shown in FIG. 1, a slant mirror 23 is provided on the carriage 20 for reflecting upward the laser beams from a stationary optical unit 4. The optical unit 4 is provided with a laser diode 40, a collimator lens 41, a beam splitter 42, a beam expander 43, and a galvano-mirror 44. The laser beams emitted from the laser diode 40 are collimated by the lens 41. Then, the laser beams pass through the beam splitter 42 and the beam expander 43, and are reflected on the galvano-mirror 44 toward the slant mirror 23. The upward beams reflected on the mirror 23 are converged by the objective lenses 5a, 5b to form a beam spot on the recording layer 99 of the disk D. The converged beams are reflected on the recording layer 99 to retrace the previous path. Finally, the laser beams are split by the beam splitter 42 and detected by an optical detector 45.

The beam expander 43 incorporates two lenses 43a, 43b for reducing the effective diameter of the laser beam. The reduced effective diameter allows the size reduction of the objective lenses 5a, 5b, which contributes to the overall weight reduction of the magnetic head H. With smaller inertia, the magnetic head H can be moved swiftly upon application of an external force. The carriage 20, arranged under the disk D, is movable in the tracking direction Tg for performing a required seek action. In place of the carriage 20, use may be made of a swing arm to move radially of the disk D with the magnetic head H attached to the arm.

The magnetic head H includes a transparent substrate 6, a magnetic layer 80, a coil 3, a dielectric layer 7, a pair of cooling metal layers 81 and a reflection preventing layer (antireflection layer) 82, as shown in FIG. 2, in addition to the objective lenses 5a, 5b mentioned above.

The substrate 6 is attached to the top of the lens holder 11 to support the magnetic layer 80, the coil 3, the dielectric layer 7, etc. The transparent substrate 6 may be made of glass. The flat lens surface 50 of the objective lens 5b is attached to the bottom surface of the substrate 6. The dielectric layer 7 may be made of transparent alumina. In this arrangement, the objective lens 5b, the substrate 6 and the dielectric layer 7 are combined to serve as a single lens.

The magnetic layer 80 is provide for enabling effective application of the magnetic field of the coil 3 to the beam spot region on the disk D. The magnetic layer 80 may be made of a Ni—Fe alloy, Co-based amorphous alloy, Fe—Al—Si alloy, a combination of Fe—C alloy and Ni—Fe alloy, Fe—Ta—N alloy, or Mn—Zn ferrite. The magnetic layer 80 may have a thickness of 8 $\mu$m and is formed with a center hole 80a for allowing the passage of the laser beams. The hole 80a is filled with the dielectric layer 7.

The coil 3 may be made by patterning a metal layer, for example. The metal layer (typically copper layer) may be formed by a conventional plating technique. The illustrated coil 3 has a two-layer structure, consisting of an upper conductive spiral 30a and a lower conductive spiral 30b connected to the upper spiral 30a. Electric current passes through the two spirals 30a, 30b in the same direction. The axis L of the coil 3 is aligned with the axis of the lens 5a and the axis of the lens 5b. To supply the coil 3 with power from outside of the dielectric layer 7, power lines (not shown) are provided to extend from a side portion of the dielectric layer 7 to the coil 3. As shown in FIG. 2, the center of the coil 3 is filled with the dielectric layer 7. This portion (light transmitting portion), designated by the reference numeral 31, should be as small as possible to reduce the inductance of the coil 3, but not too small to pass the laser beam.

The cooling layers 81, made in a form of a ring, are provided for preventing the coil 3 from being overheated. As seen from FIG. 2, the upper cooling layer 81 surrounds the upper conductive spiral 30a, while the lower cooling layer 81 surrounds the lower conductive spiral 30b. The upper spiral 30a is diametrically smaller than the lower spiral 30b. Correspondingly, the upper cooling layer 81 is made diametrically smaller than the lower cooling layer 81. For achieving the required cooling effect, the cooling layers 81 are made of a material having a higher thermal conductivity than the dielectric layer 7. In the illustrated embodiment, the cooling layers 81 and the coil 3 are made of the same material, so that they can be formed in the same process.

Figure 3:
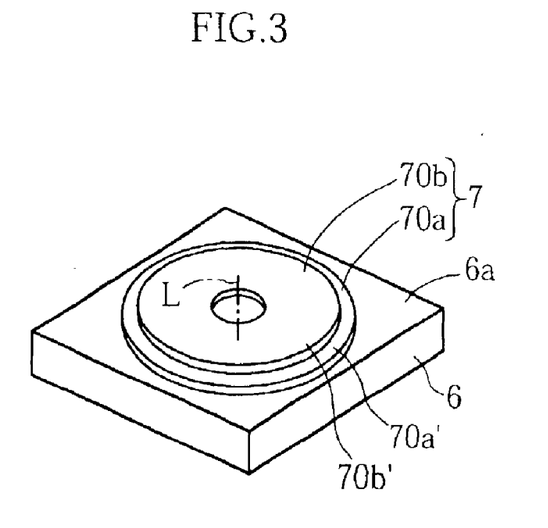
FIG. 3 is a perspective view showing the magnetic head of the present invention.

The dielectric layer 7, formed on the substrate 6, encloses the magnetic layer 80, the coil 3 and the cooling layers 81. As shown in FIGS. 2 and 3, the dielectric layer 7 includes a lower portion 70a having a thickness of h2 and an upper portion 70b having a thickness of h1. The upper portion 70b is diametrically smaller than the lower portion 70a. Thus, the circumferential part 70a' of the lower portion 70a protrudes laterally from the upper portion 70b.

Figure 4A:
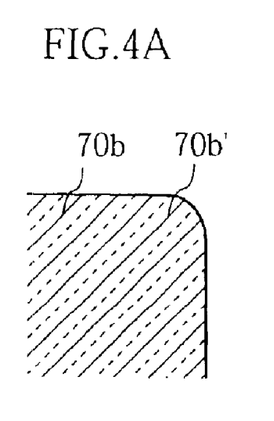
FIGS. 4A and 4B show a rounded or chamfered edge of the dielectric layer of the magnetic head of the present invention.
Figure 4B:
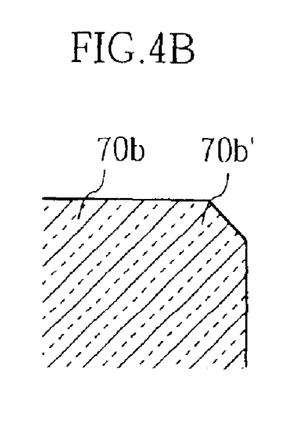

Referring to FIG. 3, the substrate 6 is rectangular, while the upper and the lower portions 70b, 70a of the dielectric layer 7 are circular and concentric (the common axis is designated by L). The circular lower portion 70a is smaller in area than the rectangular substrate 6, whereby a marginal area 6a of the substrate 6 is exposed. As shown in FIGS. 4A and 4B, the edge of the marginal area 70b' of the upper portion 70b may preferably be rounded or chamfered. This rounded or chamfered edge may preferably be coated with a lubricant (fluoric resin, for example). The technical significance of these features will be described later.

Referring to FIG. 2, the upper surface 73a of the dielectric layer 7 faces the disk D with an air layer intervening. The upper surface 73a is formed with a circular recess 73b the axis of which coincides with the axis L. The diameter of the recess 73b is larger than a laser beam diameter that is measured when the beam passes through the bottom of the recess 73b.

The reflection preventing layer 82, arranged in the recess 73b, allows the passage of the laser beam. The layer 82 may be made of silicon oxide, tungsten oxide, magnesium fluoride, or silicon nitride. In the illustrated example, the layer 82 has a single layer structure. Alternatively, the layer 82 may have a multi-layer structure including two or more sub-layers made of different materials as mentioned above. The thickness of the layer 82 should be smaller than the depth of the recess 73b so that the layer 82 does not protrude beyond the upper surface 73a of the dielectric layer 7.

The magnetic head H described above may be produced in the following manner.

Figure 5A:
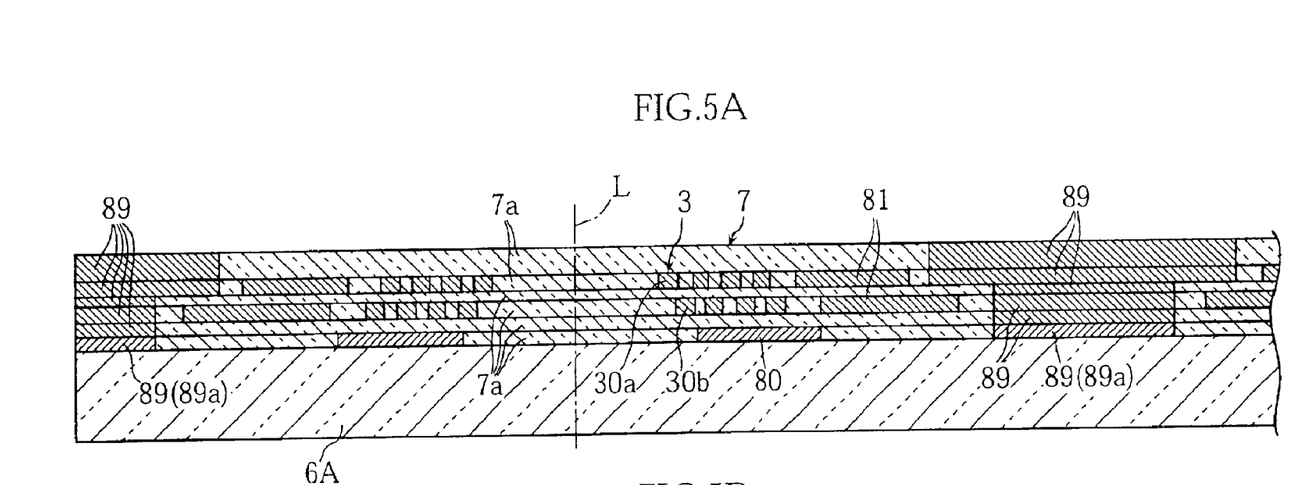
FIGS. 5A and 5B illustrate how the magnetic head of the present invention is produced.

Referring to FIG. 5A, a mother substrate 6A is prepared, which is large enough to produce a prescribed number of rectangular substrates 6 (see FIG. 3, for example). Correspondingly to the substrates 6 to be produced, the mother substrate 6A is provided with the same number of "magnetic head construction sites."

In each construction site, a magnetic layer 80, conductive spirals 30a–30b, cooling layers 81 and a dielectric layer 7 are formed, as shown in FIG. 5A, together with an assembly of dummy metal layers 89 to be removed later. In the figure, the above-mentioned reflection preventing layer 82 and recess 73b are omitted.

The dielectric layer 7 is composed of several sub-layers 7a that are stacked one upon another, as in the dummy metal layers 89. As seen from FIG. 5A, the sub-layers 7a of the dielectric layer 7 and the dummy metal layers 89 are complementary to each other on the mother substrate 6A. This structure may be built in several ways. For instance, the magnetic layer 80 and the lowermost dummy metal layer 89a are formed of the same material. Then, the lowermost sub-layer 7a is formed to cover the exposed surface of the mother substrate 6A where no magnetic layers and no dummy metal layers are provided. Then, the second lowermost dummy metal layer 89 is formed on the first lowermost dummy metal layer 89a. The material to form the second dummy layer 89 may or may not be the same as that of the first dummy layer 89a. Then, the second lowermost sub-layer 7a is formed over the magnetic layer 80 and the first lowermost sub-layer 7a. Thus, the magnetic layer 80 is entirely enclosed by the dielectric material. The remaining steps necessary to complete the structure shown in FIG. 5A are apparent to the person skilled in the art, and therefore the explanation of them are omitted.

Figure 5B:
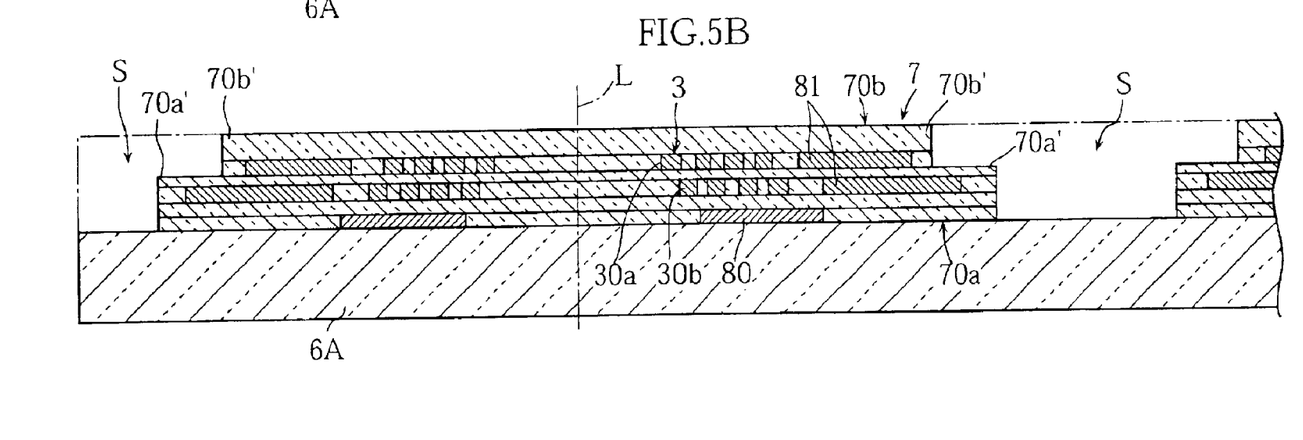

Referring to FIG. 5B, after the desired structure is completed, the dummy metal layers 89 are removed by etching, for example. Thus, the voids S are produced on the mother substrate 6A. By this etching, the magnetic layer 80, the spirals 30a, 30b and the cooling layers 81 are not removed since they are enclosed by the dielectric layer 7.

Finally, the mother substrate 6A is divided into rectangular pieces to provide a number of identical products as shown in FIG. 3. The features of the thus produced magnetic head H will now be described below.

The data writing to the disk D may be performed by magnetic field modulation, for example. According to this method, laser beams are converged by the objective lenses 5a, 5b to produce a beam spot on the recording layer 99 of the disk D, thereby heating the recoding layer 99 up to the prescribed temperature near the Curie temperature. In this state, the magnetic field generated by the coil 3 is applied to the recoding layer 99. In this manner, the direction of the magnetization in the recording layer 99 is controlled, whereby desired data is written to the disk D.

During the data writing operation, the disk D may be tilted, as in the case of the prior art. However, in the present embodiment, arrangements are made such that the tilting disk D comes into contact with the upper marginal portion 70b' of the dielectric layer 7, but not with the lower marginal portion 70a' nor the edge 6a of the substrate 6 (see the single-dot chain lines in FIG. 2). As seen from FIG. 2, the contact marginal portion 70b' is located closer to the center of the magnetic head H than the lower marginal portion 70a' and the edge 6a are. Therefore, upon contacting with the disk D being tilted, the magnetic head H receives a relatively small moment than when the lower marginal portion 70a' of the dielectric layer 7 or the edge 6a of the substrate 6 would come into contact with the tilting disk D. Accordingly, it is possible to prevent the actuator 10 supporting the head H from being damaged.

Figure 6:
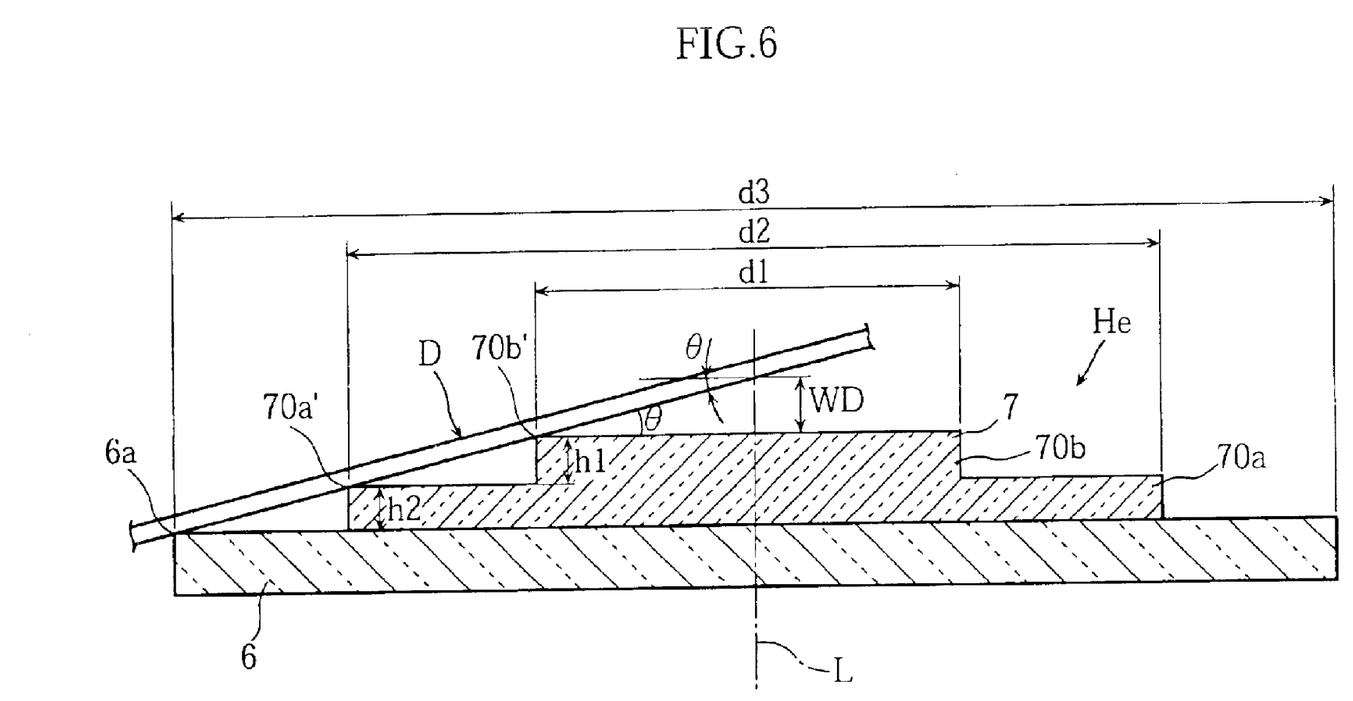
FIG. 6 illustrates how a tilting magneto-optical disk comes into contact with a model magnetic head.

FIG. 6 illustrates a simulation conducted to show how a magneto-optical disk D being tilted comes into contact with a model magnetic head He that resembles the magnetic head H of the present invention.

When the disk D is tilted by an angle θ, as shown in FIG. 6, and comes into contact with the marginal portion 70b' of the dielectric layer 7, an equation $d1=2\times WD/\tan\theta$ holds, where d1 is the diameter of the upper circular portion 70b of the dielectric layer 7, and WD is the working distance between the disk D and the dielectric layer 7.

When the disk D also comes into contact with the marginal portion 70a' of the lower circular portion 70a of the layer 7, another equation $d2=2\times(WD+h1)/\tan\theta$ holds, where d2 is the diameter of the lower portion 70a. Therefore, to prevent the lower marginal portion 70a' from contacting with the tilted disk D (with the inclination angle θ), the diameter of the lower portion 70a is set to be smaller than $2\times(WD+h1)/\tan\theta$.

Likewise, when the disk D comes into contact with the edge 6a of the substrate 6, an equation $d3=2\times(WD+h1+h2)/\tan\theta$ holds, where d3 is the maximum length of the substrate 6. Therefore to prevent the edge 6a from contacting with the tilted disk D (with the inclination angle θ), the maximum length of the substrate 6 is set to be smaller than $2\times(WD+h1+h2)/\tan\theta$.

As previously described, the magnetic head H of the present invention is moved in the focus direction Fs by the actuator 10. With such an arrangement, the distance between the head H and the disk D is set to be relatively large (about 30 μm for example) in comparison with a slider type magnetic head designed to float over the rotating disk by the intervening air flow. This value (i.e. 30 µm), however, should not be put into the parameter WD of the above-obtained equations for determining the diameter d2 or the maximum length d3, since the magnetic head H, moved by the actuator 10, may actually come closer to the disk D. In light of this, to be on the safer side, the input value for the WD should be 7 µm, for example. The inclination angle θ may be in a range of 10–20 mrad, for example.

In the present embodiment, the upper portion 70b of the dielectric layer 7 is circular, as seen from FIG. 3. This round edge arrangement is advantageous to preventing the tilted disk D from being damaged upon contacting with the upper portion 70b of the dielectric layer 7. To provide more secure damage prevention, the edge of the marginal portion 70b' may be rounded or chamfered, as shown in FIGS. 4A and 4B, and further be coated with a fluoric lubricant.

In the magnetic head H, the laser beam emitted from the light source passes through the objective lenses 5a–5b, the dielectric layer 7 and the reflection preventing layer 82 to travel toward the recording layer 99. The refraction index of the reflection preventing layer 82 is lower than that of the dielectric layer 7 but higher than that of the air. Advantageously, this reduces the reflection of the laser beam passing through the interface between the dielectric layer 7 and the reflection preventing layer 82 and the interface between the reflection preventing layer 82 and the air. As a result, the recording layer 99 is effectively irradiated by the laser beam.

The reflection preventing layer 82 is unprotrudingly received in the recess 73b of the dielectric layer 7, so that it does not damage the disk D even when the disk D comes close to the dielectric layer 7. Further, the reflection preventing layer 82 is firmly fitted into the recess 73b. This prevents the layer 82 from unduly coming off the dielectric layer 7 when the tilting disk D bumps into the magnetic head H.

The present invention is not limited to the specific features depicted in the drawings. For instance, the coil 3 may have only a single conductive spiral or more than two conductive spirals. Similarly, the dielectric layer 7 may have only a single sub-layer or more than two sub-layers. Further, the dielectric layer 7 may be provided, on its upper surface 73a, with a circular projection that can be brought into contact with the disk D. This contact projection may or may not be made of a dielectric material.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A magnetic head comprising:
   a coil for generating a magnetic field applied to a recording medium;
   a substrate having a principal surface facing the recording medium, the principal surface including an inner region and an outer region surrounding the inner region; and
   a contact member facing the recording medium, the contact member coming into contact with the recording medium when the recording medium tilts;
   wherein the contact member is disposed only within the inner region of the principal surface so as to prevent the tilted recording medium from coming into contact with the outer region of the principal surface;
   wherein the contact member includes a dielectric layer enclosing the coil; and
   further wherein the dielectric layer includes a lower sub-layer and an upper sub-layer formed on an inner region of the lower sub-layer, the upper sub-layer including a marginal portion that comes into contact with the tilted recording medium.

2. The magnetic head according to claim 1, wherein the dielectric layer includes a marginal portion spaced from an outer edge of the substrate toward a center of the substrate, the marginal portion spaced from the outer edge of the substrate coming into contact with the tilted recording medium.

3. The magnetic head according to claim 2, wherein the marginal portion of the dielectric layer is rounded.

4. The magnetic head according to claim 2, wherein the marginal portion of the dielectric layer is chamfered.

5. The magnetic head according to claim 1, wherein the coil includes a first conductive spiral portion and a second conductive spiral portion, the first conductive spiral portion being arranged within the upper sub-layer, the second conductive spiral portion being arranged within the lower sub-layer.

6. The magnetic head according to claim 1, wherein the contact member is coated with a lubricant.

7. A magnetic head comprising:
   a substrate including a principal surface facing a recording medium;
   a magnetic field generating coil formed on the principal surface of the substrate and comprising a first conductor and a second conductor that is located closer to the recording medium than the first conductor; and
   a dielectric layer formed on the principal surface of the substrate and enclosing the coil;
   wherein the second conductor is smaller in outer diameter than the first conductor, and
   wherein the dielectric layer has a stepped configuration that includes a first portion enclosing the first conductor and a second portion enclosing the second conductor, the second portion being smaller in size than the first portion.

8. The magnetic head according to claim 7, further comprising a first cooling metal ring that surrounds the first conductor and a second cooling metal ring that surrounds the second conductor, the second cooling metal ring being smaller in diameter than the first cooling metal ring.

9. The magnetic head according to claim 7, further comprising an objective lens arranged on an opposite side to the principal surface of the substrate for convergence of light beams emitted from a light source, wherein the converged light beams pass through the substrate and the dielectric layer to travel toward the recording medium.

10. The magnetic head according to claim 9, further comprising an antireflection layer facing the recording medium, wherein the antireflection layer is arranged within a recess formed in the dielectric layer, and wherein the converged light beams pass through the antireflection layer and then travel toward the recording medium.

11. The magnetic head according to claim 7, wherein the substrate is supported by an actuator so as to be moved closer to and away from the recording medium by the actuator.

12. A data writing/reading apparatus comprising a magnetic head according to claim 7.

* * * * *